United States Patent [19]

Blount et al.

[11] Patent Number: 4,633,245

[45] Date of Patent: Dec. 30, 1986

[54] LOCAL AREA NETWORK INTERCONNECT SWITCHING SYSTEM

[75] Inventors: Marion L. Blount, Mahopac; Brent T. Hailpern, Katonah, both of N.Y.; Robert A. Heller, Morgan Hill, Calif.; Lee W. Hoevel, Yorktown Heights, N.Y.; Gene E. Trivett, Portola, Calif.

[73] Assignee: International Business Machines Corporation, Armonk, N.Y.

[21] Appl. No.: 567,197

[22] Filed: Dec. 30, 1983

[51] Int. Cl.⁴ .................... H04Q 1/00; H04Q 11/00
[52] U.S. Cl. ........................ 340/825.03; 340/825.83; 370/60
[58] Field of Search .............. 340/825.03, 825.83, 340/825.15, 825.29; 364/134, 200; 370/89, 67, 60

[56] References Cited

U.S. PATENT DOCUMENTS

| | | | |
|---|---|---|---|
| 3,573,747 | 4/1971 | Adams | 364/300 |
| 3,648,249 | 3/1972 | Goldsberry | 364/900 |
| 3,699,532 | 10/1972 | Schaffer et al. | 364/200 |
| 3,984,819 | 10/1976 | Anderson | 364/200 |
| 4,019,176 | 4/1977 | Cour et al. | 364/900 |
| 4,057,849 | 11/1977 | Ying et al. | 364/200 |
| 4,227,178 | 10/1980 | Gergaud | 340/825.009 |
| 4,323,967 | 4/1982 | Peters | 364/200 |
| 4,376,982 | 3/1983 | Bantz | 364/900 |
| 4,379,950 | 4/1983 | Ahmed | 179/18 ES |
| 4,393,381 | 7/1983 | Seiden | 340/825.83 |
| 4,403,321 | 9/1983 | Kruger | 370/67 |

OTHER PUBLICATIONS

Remote Terminal System, D. R. Spencer, *IBM Technical Disclosure Bulletin*, vol. 5, No. 2, Jul. 1962, pp. 61–64.

*Primary Examiner*—Donald J. Yusko
*Attorney, Agent, or Firm*—George E. Clark; Thomas P. Dowd; Terry J. Ilardi

[57] ABSTRACT

A system is shown for connecting a plurality of intelligent terminals through a central non-blocking switch to each other, to a partitioned memory and to one or more service processors to form a local area network.

9 Claims, 20 Drawing Figures

PC — INTELLIGENT TERMINAL
PC-PS — PRINT SERVER IMPLEMENTATION
PC-FS — FILE SERVER IMPLEMENTATION
PC-SM — SHARED MEMORY IMPLEMENTATION

FIG. 14

|        |   | 8243 A    | 8243 B     | 8243 C     |
|--------|---|-----------|------------|------------|
| PORT 4 | 3 | DSEL 3    | DATABUS 3  | 5DLCBCON   |
|        | 2 | " 2       | " 2        | *          |
|        | 1 | " 1       | " 1        | *          |
|        | 0 | " 0       | " 0        | *          |
| PORT 5 | 3 | OUTSEL    | TSLOT 3    | *          |
|        | 2 | SET ACK   | " 2        | *          |
|        | 1 | MUXENABLE | " 1        | *          |
|        | 0 | 5 RESET   | " 0        | *          |
| PORT 6 | 3 |           | RS − CLR   | RS STATE   |
|        | 2 |           | RS − SET   | *          |
|        | 1 |           | RC − CLR   | *          |
|        | 0 |           | RC − SET   | *          |
| PORT 7 | 3 |           | ACK STATE  | *          |
|        | 2 |           | SYNCD      | *          |
|        | 1 |           | RC − STATE | *          |
|        | 0 |           | ACK IN     | *          |

LOCAL AREA NETWORK INTERCONNECT SWITCHING SYSTEM

BACKGROUND OF THE INVENTION

1. Field of the Invention

The present invention relates to method and apparatus for data processing and more particularly to method and apparatus for connecting intelligent terminals to each other or to a partitioned storage system through a central switch to form a local area network.

2. Description of the Prior Art

In the prior art there many local area network switching systems. The following are systems representative of the prior art.

U.S. Pat. No. 4,379,950, shows a telecommunications switching system using distributed group or modular architecture and time division principals in which data is transmitted on a plurality of buses between processors accessing those buses and in which all data transmitted between processors is stored in a temporary memory within a group or module and is read in response to a scan of that temporary memory. Although the patent shows the computer controlled distributed communications system, it does not teach nor suggest a plurality of intelligent terminals connected to each other and through a central switch to a partitioned memory in accordance with the present invention.

U.S. Pat. No. 3,984,819 shows an interconnection switching matrix for a data processing system including processor units and resource units. The system permits predetermined units to communicate with each other to the exclusion of other units or all units may simultaneously communicate with each other. The patent does not show a system for connecting a plurality of intelligent terminals to each other and through a central switch to a partioned memory in accordance with the present invention.

U.S. Pat. No. 3,648,249 shows an audio responsive visual display system incorporating audio and digital information segmentation and coordination. Terminals are switched under control of a central switch to one of a plurality of operator transcription stations. Although the patent shows a system including a central switch, it does not show a system for connecting a plurality of intelligent terminals to each other and through a central switch to a partitioned memory in accordance with the present invention.

U.S. Pat. No. 3,699,532 describes a partitioned storage system in a multi-programmed data processing system. However, the patent does not show a system for connecting a plurality of intelligent terminals to each other and through a central switch to a partition memory in accordance with the present invention.

U.S. Pat. No. 4,227,178 shows a decentralized data transmission system including a number of terminals connected through transmission stations to a loop. However, the patent does not show a system for connecting a plurality of intelligent terminals to each other and through a central switch to a partitioned memory in accordance to the present invention.

U.S. Pat. No. 4,019,176 shows a system and method for reliable communica-tion of stored messages among stations over a single common channel with a minimization of service message time. Although the stations are interconnected by a single common transmission channel, no central control unit is employed in the system.

U.S. Pat. No. 4,376,982 shows a communication system including a number of requesting units and a number of responding units representing resources. The patent shows interface logic for requestors and resources to create and respond to signals comprising a protocol that consists of a request message broadcast from one requestor to all resources in the network with the capability of providing a desired service; exceptance message transmitted from all resources that receive the request message and can currently provide service; a confirmation message from the requestor to the resource; cancellation messages from the requestor to all other resources; retransmission of acceptance messages by resource until a confirmation or cancellation is received. The patent does not show a system for interconnecting a plurality of intelligent terminals to each other and through a central switch to a partitioned memory in accordance with the present invention.

U.S. Pat. No. 4,323,967 shows a data processing system having a central subsystem including a plurality of special purpose processing units with one of the processing units serving as a control processing unit within the subsystem, processing units being coupled to a common bus for the transfer of data control information and address information within the subsystem. The patent does not show a system for connecting a plurality of intelli-gent terminals to each other and through a central switch to a partitioned memory in accordance with the present invention.

U.S. Pat. No. 4,057,849 shows a text editing and display system including a display controller, a central processor, a memory unit, a plurality of CRT raster scan displays and an input device such as a keyboard. Information from the CPU is passed through a multiplexed memory to display controller's switch write the CRT display with appropriate text information. The terminals do not include any processing capability nor any local storage. The patent does not show a system for connecting a plurality of intelligent terminals to each other and through a shared central switch to a partitioned memory in accordance with the present invention.

U.S. Pat. No. 3,573,747 shows a communication system having a plurality of dumb terminals connected to a central processor wherein all communications must be passed through the central processor from terminal to terminal. The patent does not show a system for connecting a plurality of intelligent terminals to each other and through a central switch to a partioned memory in accordance with the present invention.

IBM Technical Disclosure Bulletin, Vol. 5, No. 2, July 1962, page 61 and following shows a remote terminal system in which a plurality of remote terminals which lack intelligence are multiplexed through a common switch arrangement to one or more buffer storage units. A buffer address memory in the multiplexer has individual locations associated with each terminal for controlling storage unit assignments. However, the article does not show a system for connecting a plurality of intelligent terminals to each other and through a central switch to a partitioned memory in accordance with the present invention.

The prior art discussed above does not teach nor suggest the present invention as disclosed and claimed herein.

SUMMARY OF THE INVENTION

It is therefore, an object of the present invention to form a local area network or a cluster on a network to provide communications between a number of intelligent terminals by partitioning a central storage into a number of shared modules proportional to the number of intelligent terminals and by controlling communication between the terminals and the central storage by a central switch.

Accordingly, a system for connecting a plurality of intelligent terminals to each other and through a central switch to a partitioned memory and to one or more service processors includes a plurality of intelligent terminals; one or more storage units partitioned into a plurality of shared modules, there being at least one of said modules for each of said terminals; and a central switch connecting said plurality of intelligent terminals to said storage units, said switch controlling communication between any of said terminals, between any of said terminals and one or more of said shared modules, and between any of said terminals and one or more service processors and between said service processors and said shared memory.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 14 is a chart relating port control signals to specific port lines.

In the drawing, like elements are designated with similar reference numbers, and identical elements in different specific embodiments are designated by identical reference numbers.

DESCRIPTION OF A PREFERRED EMBODIMENT OF THE INVENTION

References

Throughout this description, there are a number of references to commercially available integrated circuits. Detailed information regarding these circuits may be found in the following manuals:

MCS-48 Family of Single Chip Microcomputers User's Manual, *Intel Corporation,* October, 1981.

8048 Family Applications Handbook, *Intel Corporation,* January 1980.

Signetics Multi-Protocol Communications Circuit (MPCC/SDLC) 2652, *Signetics Corporation,* November 1979.

1. Introduction

The present invention relates to a Local Area Network system including a cluster switch which can serve as an entry-level vehicle for interconnecting intelligent terminals in a peer-to-peer communications environment.

2. System Overview of the Cluster System

The local area communications environment can serve as an entry-level local area network (LAN) or as a cluster set to a particular local area network. Generally, it is believed that within establishments, relatively small sets or clusters (2-32 in number) of intelligent units will be formed which will have the natural tendency to communicate frequently among each other and infrequently with other units in the establishments. The elements of the cluster set will be more physically clustered and will share a closer relationship than random elements of the establishment. Another factor is that every intelligent unit probably will not be connected directly to the establishment LAN. Multiple intelligent units will most likely share a common interface to the LAN, thus forming a cluster.

One key element in this cluster environment is that a shared memory module is one of the switch-connected units. The shared memory can be used as a temporary store for messages and files. Since it is intended for temporary storage uses, volatility is not a major concern. The shared memory needs and is assumed to have an interface element intelligent enough to execute the switch interface protocols and command protocols that are presented below.

Terminal-Switch Interaction

Figure 1:
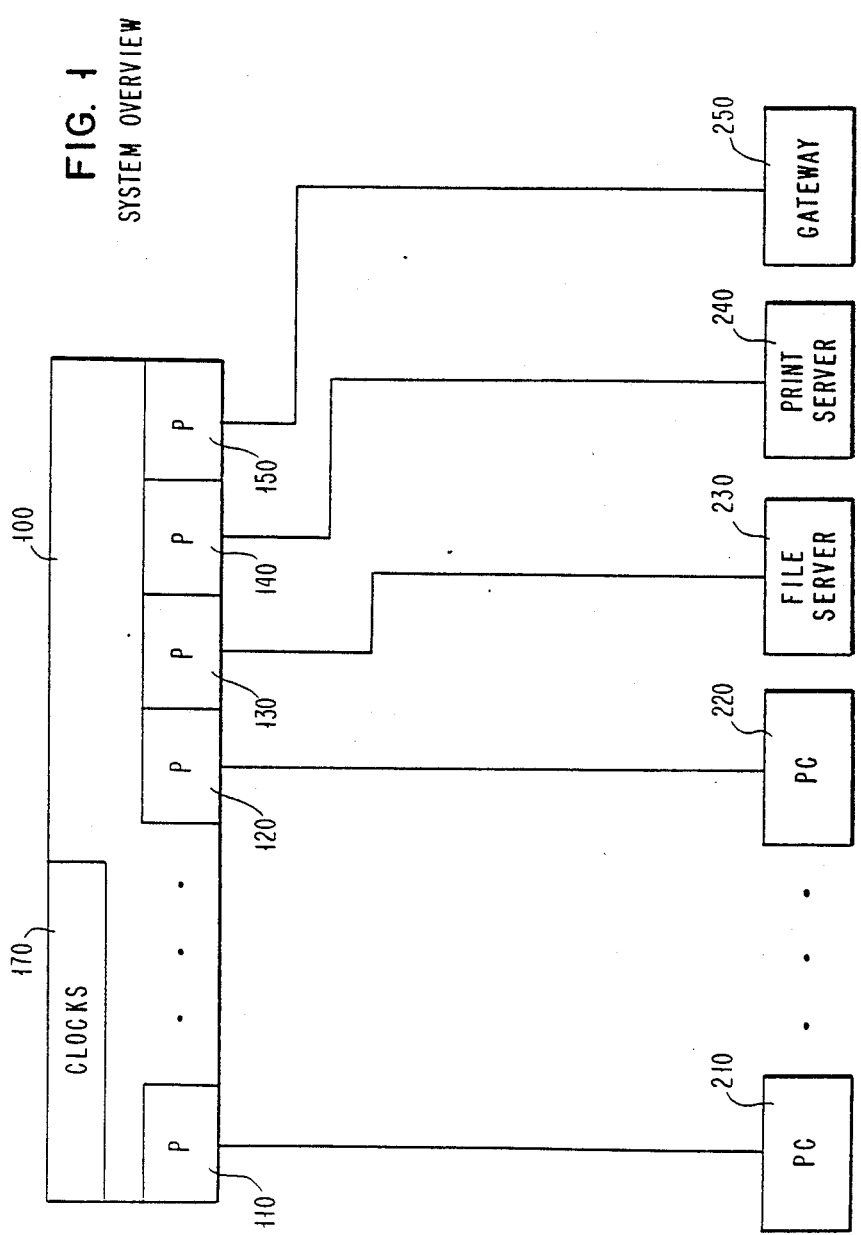
FIG. 1 is a block diagram of a switching system according to the method and apparatus of the present invention.

Referring now to FIG. 1, a multiple-node cluster of personal computers (PC) according to the present invention will be described. Each PC 210-240 is connected to nonblocking switch 100 by either a full- or half-duplex data link. In addition to the Intelligent terminals, 210-240, Switch 100 controls a gateway 250 to a larger network or another cluster. The gateway is connected to port 150. (The switch assumes that the link is half-duplex for switch-PC control message exchanges.) Each element of the cluster has its own switch port 110-150 with which it interacts in setting up and taking down data paths through switch 100. The switch port contains hardware to send and receive frames and controls to implement the path control functions and to interact with the PC.

Figure 2:
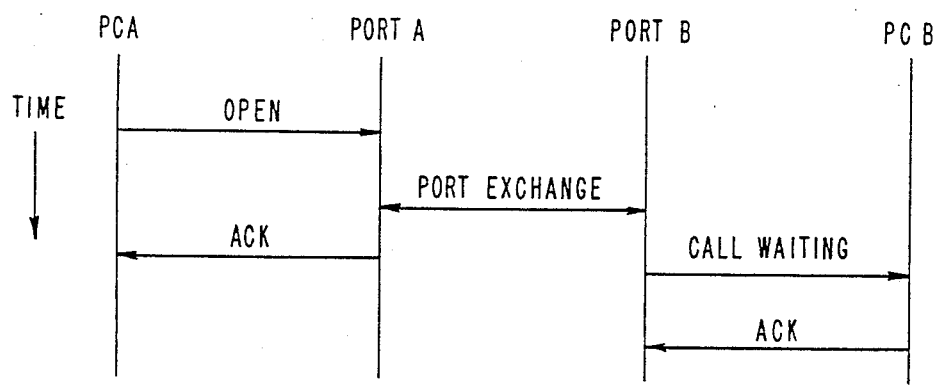
FIG. 2 is a control message flow diagram for an Open sequence.

Paths through switch 100 are set up and taken down as the result of control message sequences between ports 110-150 and PCs 210-240. All control messages are Synchronous Data Link Control (SDLC) Information frames with one-byte Instruction (I-fields). All intelligent units that are attached to the switch are primary SDLC stations and all switch ports are secondary SDLC stations. The requirement that all SDLC stations in the cluster have unique station addresses ensures that each station can identify control messages by examining the frame address field. The control messages are given below:

Open(K): message sent by PC to its switch port requesting that a connection be established linking the PC to the unit attached to switch port k Close: message sent by PC to its switch port requesting that the established connection be terminated Call Waiting(J): message sent by switch port to its attached unit indicating that unit attached to switch port j is waiting on newly established path Ack: message that indicates positive concurrence with an Open, Close or Call Waiting message NACK: message that indicates negative concurrence with an Open, Close or Call Waiting message The PC-switch protocols will be illustrated by the following example in which PC#A seeks establishment of a switch path to PC#B. The control message flow is illustrated in FIG. 2. PC#A sends an Open(B) message to its switch port. Switch ports #A and #B exchange information regarding this request. This exchange is internal to the switch. If the link to PC#B is busy (same as switch port #B busy), switch port #A sends a Nack message to PC#A. If switch port #B accepts the request, switch port #A sends an Ack message to PC#A. PC#B will receive a Call Waiting(A) message from its switch port. It must send an Ack to the switch port.

The protocol specifies that the called unit must send the first message in a conversation on a newly established path. In the above case, the first message is sent from PC#B to PC#A.

Figure 3:
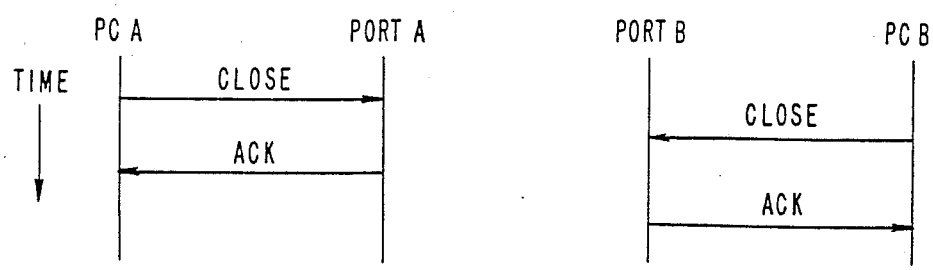
FIG. 3 is a control message flow diagram for a Close sequence.

Once a path has been established, the two units are connected on a point-point SDLC data link. The switch is transparent to established connections and does not interfere with the data as it passes through the switch. Switch ports continuously monitor the data stream from their associated units looking for the Close control message. After acknowledging the Close message, the switch port returns to the nonbusy state. The closing control message exchange is given in FIG. 3.

Overview of the Switch

The two distinct sections in the switch are the clock logic and the port logic (see FIG. 1). The clock logic 170 generates common clocks used by the ports 110-150 and the clock signals for the time slot bus over which the ports exchange control information. There is one port associated with each node in the cluster. The key to the low-cost implementation of the switch is the mulit-function communications controller chip. This chip performs many of the nontrivial control functions that are a part of the SDLC data link protocol. The port control is implemented in firmware on a low-cost single chip microcomputer.

Figure 4:
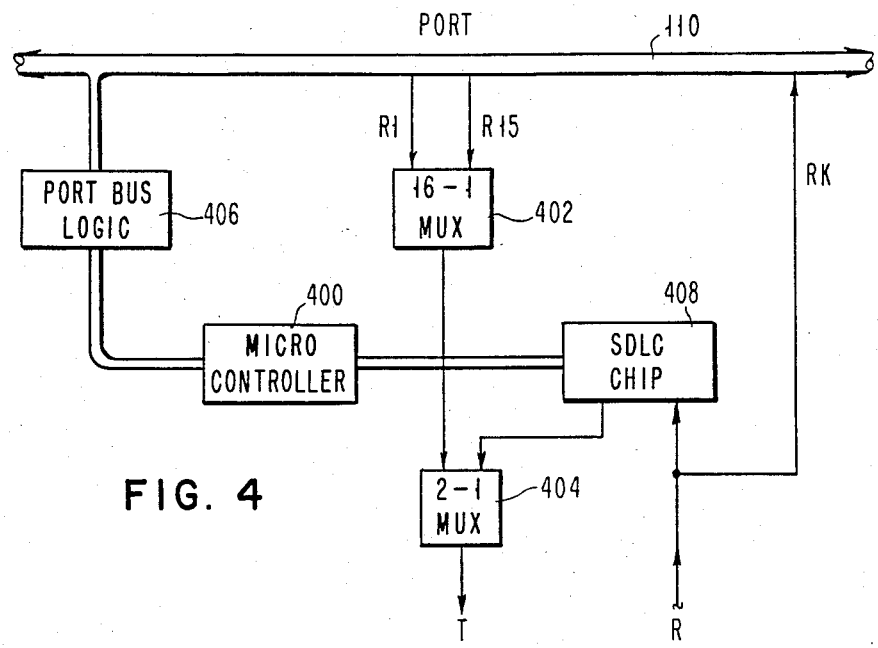
FIG. 4 is a block diagram of a port according to the present invention.

A high-level port design diagram is given in FIG. 4. All incoming data streams from units are fanned out to the SDLC chip and through the switch port to the backplane. There, the serial data streams can be simultaneously observed by all of the switch ports. These data streams are inputted in a multiplexer contained in each switch port. Thus, the switch function is a distributed switch which is performed in each switch port under the control of the local control element.

The switch module can support simultaneous connections. Even the control sequences can proceed in parallel assuming no port conflicts. Assuming the same data link technology, the switch module provides greater data transfer capability than a single bus or ring cluster implementation.

2. Interfaces between Switch-Connected Units

Figure 5:
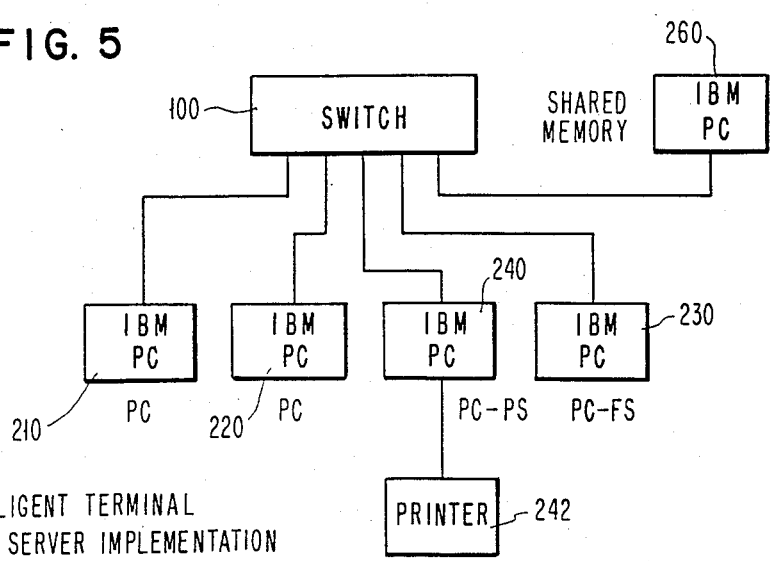
FIG. 5 is a block diagram of system embodying the present invention.

A proposed implemenatation of a system according to the present invention is illustrated in FIG. 5. What is proposed is that IBM PCs 210-240 be used to implement the various entities that connect to the switch. A PC-based implementation of each of the switch connected entities in FIG. 5 will now be shown. The interaction among the entities will be described for the PC-based implementations. Only the Transmit Data and Receive Data lines are used for the connection between the PC and the switch. Some of the EIA lines are preset to certain logic values or are set under program control in order for the card to operate properly. This is an artifact of the card design and the EIA interface and are not germane to the overall implementation.

Figure 6:
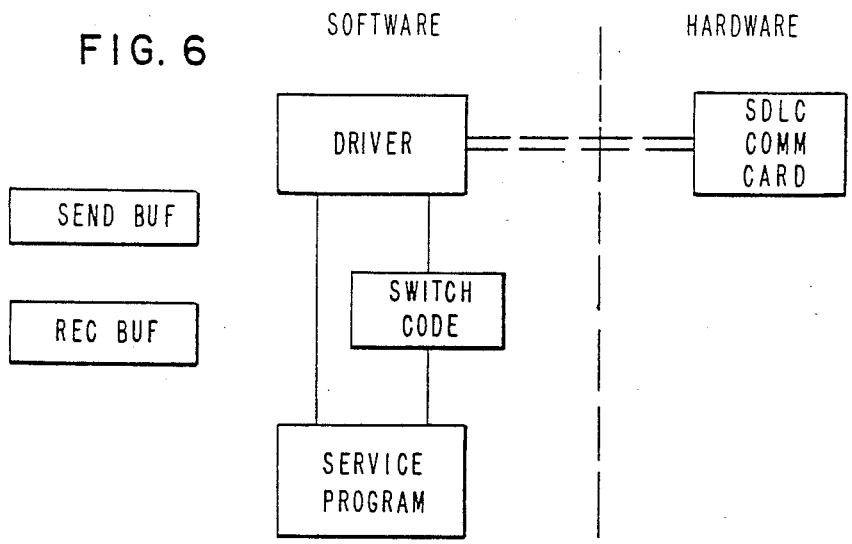
FIG. 6 is a diagram showing system control software organizaton.

There are three pieces of host software that are relevant to the implementations (see FIG. 6). The driver is that component that is close to the hardware. It contains code to (1) initialize the SDLC board, (2) send an SDLC frame and (3) receive an SDLC frame. Associated with the driver are a send buffer and a receive buffer.

The second component is labeled the switch code. The switch code is responsible for the switch protocols. The switch protocols will be described in some detail for the implementation in the switch ports. A similar implementation can be followed for the switch code in the terminal.

The service program is particular to the switch connected entity being implemented. In the PC user terminals, the service program is the same as the application/screen manager program. In the file server, the service program is the program that provides the file management and file services routines. The discussion of implementations that is to follow uses the concept of a file that is prevalent in microcomputer and personal computers. Some of the relevant concepts are reviewed.

The basic unit of access in secondary storage in personal computers and intelligent stations is the sector. Sectors are identified by numbers, i.e., Sector 29. Sectors also are of fixed length per device with the most popular size being 128 bytes. Thus, a 380K byte floppy disk would contain 2969 128-byte sectors (380032 bytes). Given a sector number, the hardware/firmware/software that manages that hard disk or floppy disk can read the sector or write to that sector. The techniques for doing this are standard knowledge to anyone familiar with the current art.

Figure 7:
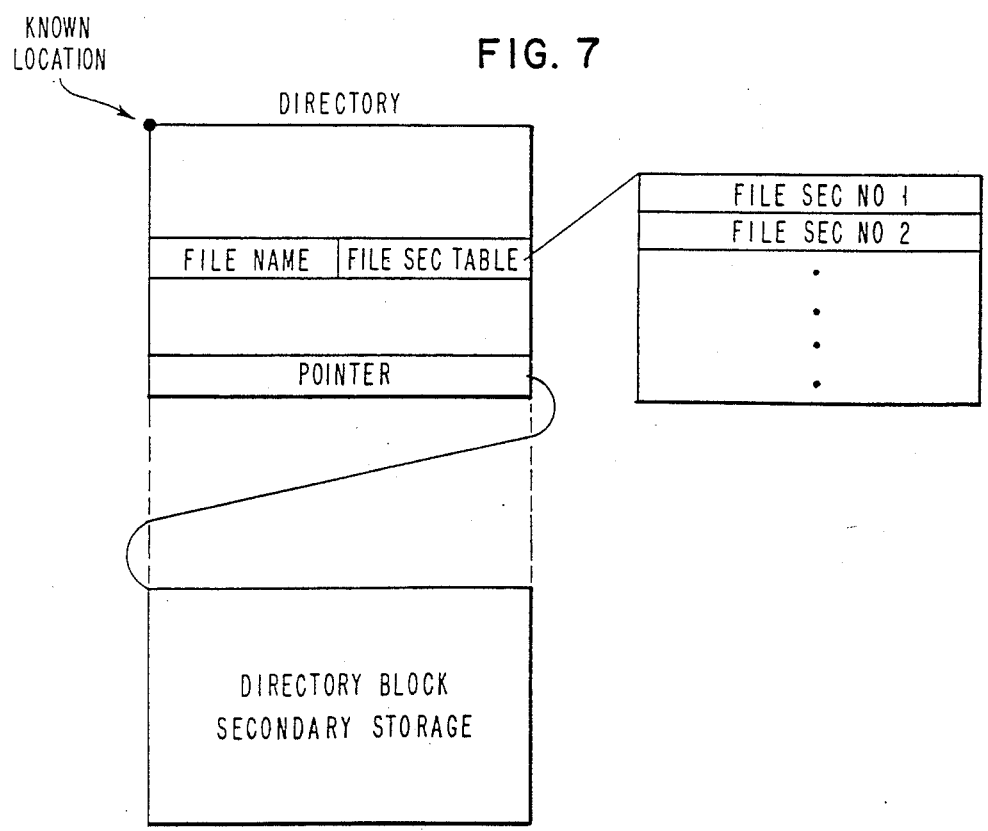
FIG. 7 is a diagram showing File Sector Table organization.

A file is a related set, usually ordered, of records. One simplified way of viewing is that a record is the data that is stored in a sector. Therefore, a physical file is a set of related and ordered sectors. The system uses a special file called a directory to keep track of the file system. The directory is known to be the first k sectors with extension based on linkage pointers. There is an entry in directory for each file in the system. See FIG. 7. The entry contains the name of the file, a set of file attributes, and a pointer to the File Sector Table (FST). When a user requests an inactive file, the file manager software searches the directory until it finds an entry with a filename that matches the requested file. The entry and file map are kept in main memory while the file is active. The FST is a set of ordered sectors. The FST is also stored on secondary storage with the unit of allocation being a sector. FST larger than one sector can be established using pointer conventions.

End-End Message Formats

The basic unit of information flow through the switch is an SDLC frame. The frame (to be discussed below) consists of header, trailer, and data field. The header and trailer are generally added by link level protocols and is not seen by application programs. In SDLC notation, application programs exchange the information field of an SDLC information frame. The following is the format of the information field that is used by application programs and service programs.

Length: 2 bytes
Type: 2 bytes
Auxiliary Type: —
Data: —

The Length field contains the length of the information field including the length field. The Type field contains an encoding for the message type or command. The Auxiliary Type field contains additional data relating to the command or message. Its length is inferred from the Type.

There is generally some maximum length for an SDLC frame that depends on link error characteristics, interface hardware, or internal buffering considerations. A message may be sent in contiguous SDLC frames. A zero Type field means that the last nonzero type applies, thus, the second frame in a message will have a zero in the Type field of the Information field. The particular message types and commands will be given when the implementations are discussed.

Shared Memory Unit

Shared Memory is an important concept in this interconnection scheme. The Shared Memory implements Mailboxes and Fileboxes.

Mailboxes

Mailboxes are a way for a user or server to leave another user or server a short message. This would be used in case the desired user or server is not available at the time the conversation is initiated. There is mailbox for each switch-connected unit. Each mailbox has a slot for every switch-connected unit. All units can write one message to Unit A's mailbox. Only Unit A can read his mailbox. No synchronizing primitives are needed. There is a bit associated with each mailbox slot to indicate whether the slot is empty or full. Mail can only be placed in an empty slot.

The four mailbox functions are Msg, File Present, Slot Status Req, and Get Mail.

Msg

The Type field specifies Msg. The Auxiliary field contains a one-byte Source Unit ID and a one-byte Destination Unit ID. The Data field, maximum size 122 bytes, contains the message.

The response is either Nack or Ack. Ack means the message was successfully stored. Nack means the mail slot is full.

File Present

The Type field specifies File Present. The two byte Auxiliary field contains the IDs. The Data field contains the name of a file that has been stored in the Filebox for the Destination Unit.

The response is either Nack or Ack. Ack means the message was successfully stored. Nack means the mail slot is full.

Slot Status Req

The Type field contains the encoding for Slot Status Req. The two byte Auxiliary field contains the IDs.

The response is either Nack or Ack. Ack means the slot is empty. Nack means the slot is full.

Get Mail

The Type field specifies Get Mail. The first byte of the Auxiliary field contains the Source Unit ID. The remainder of the Auxiliary field is a bit vector with one bit per switch-connected unit. The Unit IDs are numbers from 1 to N, where N is the number of switch-connected units. Units are therefore easily associated with a bit in the bit vector. If bit k is a 1, then mail from Unit k is sent in the response message. If bit k is a 0, no mail from Unit k is sent in the response message. An all-one bit vector says send all of my mail.

The response is a message with the same Type field as the request. The Auxiliary field contains the Source Unit ID and the Destination Unit ID. The Source Unit ID is the ID of the Shared Memory Unit. The Data field in the message contains the mail. The Length field in the message is the length of the message. The requesting unit deblocks the messages using the Length field which is a part of every mailslot message.

Implementation

The Shared Memory can be implemented on an IBM PC XT that is connected to a port on the switch. The hard disk can be used as the shared storage and the management routines and algorithms can be implemented in software.

The mailbox for Unit k can be implemented as a N-record file named Mail_k, where N is the number of switch connected elements. Each record is 128 bytes in length and corresponds to a disk sector. The need to write the entire file every time mail is received can be avoided it the Mailbox control routine can obtain access to the Directory and File Sector Table and to issue the sector write command to the disk. This implies that part of the Mailbox control routine must be a part of the Base I/O System of the operating system.

The following explains how the Msg command might work for this implementation. Assume that mail arrives from Unit A destined for Unit B. The message will be passed from the SDLC driver routine to the shared memory service routine. The Type field will specify Msg. The service routine can determine which mailfile to fetch by examining the Destination Unit ID. The FST for that file is fetched. The Source Unit ID is used to determine which FST entry to examine. The slot status bit is examined. If the slot is free, the bit is set to 1 and the slot number is obtained. The sector write command is issued to the hard disk controller. The response is formulated and passed to the SDLC driver routine.

Filebox

A filebox is a temporary place for a unit to put a file destined for another unit. A file can be viewed as a long message. Fileboxes will most probably be used by the terminal PCs for files that are destined to the (print and file) server units. Assume that a user wants to print a file but finds that the print server is busy. Rather than continuously repeat the request, the user can put the file in a filebox and send mail message (File Present) informing the print server that the file is in a filebox. When the print server reads its mail, it will see the File Present message, retrieve the file and print it.

There must some limitations placed on the number of fileboxes a unit can have and the size of the filebox. In a 16-unit system, limits of 5 fileboxes per unit and 100K bytes per filebox uses 8M bytes of a 10M byte hard disk.

The two filebox commnds are Filebox Fetch (FBFetch) and Filebox Store (FBStore).

The Type field specifies the encoding for FBStore. The first two bytes of the Auxiliary field contains the Destination Unit ID and the Source Unit ID. The remainder of the Auxiliary field contains the name of the file.

FBFetch

The Type field specifies the encoding for FBFetch. The first two bytes of the Auxiliary field contains the Destination Unit ID and the Source Unit ID. The remainder of the Auxiliary contains the name of the file.

Implementation of Fileboxes

The PC serving as the shared memory controller will maintain a file named Filebox_i for each Unit i in the system. There will be M 128-byte records in each such file, where M is the maximum number of fileboxes a unit can have. Each record will be all 0's or contain the name of the file presently in that filebox. Each file stored in a filebox is stored as a conventional file in a hard disk system. It's name appears in the system directory.

When a FBStore command is received, the Source Unit ID is used to determine which Filebox_i file to obtain. The records in that file are examined to see if there is an empty filebox. If there is a free filebox, the name of the file is written into the record. The file is then received and store in the conventional manner.

When a FBFetch command is received, the Unit IDs are examined to determine which Filebox_i file to obtain. The records are matched against the name in the FBFetch request. If the file is present, it is fetched in the conventional manner. If the file is not present, NACK is returned as the response.

File Server

The file server is a repository of files for the system. The three file server commands are StoreFile, FetchFile and DeleteFile. These commands will flow as messages seperate and distinct from the file (which can flow as a sequence of messages or as one message).

StoreFile

This command flows from a unit to the file server.

The type field contains the encoding for Storefile. The first two bytes of the Auxiliary field contains the Unit IDs. The Destination Unit ID is the ID for the fileserver. The remainder of the Auxiliary field contains the name of the file.

FetchFile

This command flows from a IT to the file server. The field definitions are similar to StoreFile.

DeleteFile

This command flows from a IT to the file server. The field definitions are similar to StoreFile.

| File Server Flows | | |
|---|---|---|
| IT | | File Server |
| FetchFile | → | |

-continued

| | | |
|---|---|---|
| | ← | File \| Nack |
| StoreFile | → | |
| | ← | Ack \| Nack |
| File | → | |
| DeleteFile | → | |
| | ← | Ack \| Nack |
| Flow between Intelligent Terminal and File Server | | |
| Shared Memory | | Unit |
| | ← | Get Mail |
| Mail | → | |
| | ← | FileFetch |
| File | → | |
| Flow between Units and Shared Memory | | |

Print Server

The print server commands are PrintFile, PrintQStatus, and UnqueuePrintFile.

PrintFile

The Type field contains the encoding for Printfile. The Source Unit ID is the source unit of the print file. The Destination Unit ID is the print server. The remainder of the Auxiliary field is the name of the print file.

PrintQStatus

The Type field contains the encoding for PrintQStatus. The Source Unit ID is a terminal unit. The destination ID is the print server. In response to this request, the Print Server will send the filename and source ID of the file it is currently printing and the filenames and source files of the files queued for printing.

UnqueuePrintFile

The Type field contains the encoding for UnqueuePrintFile. The Source Unit ID is a terminal unit. The destination ID is the print server. The Auxiliary field contains the name of a file. On receipt of the request, the Print Server will search the list of unqueued print files for the name of the file in the request. If the file is found in the queue, the file is deleted from the queue and an Ack is sent to the terminal unit in response to the request. If the file is not in the queue, a Nack is sent in response to the request.

Implementation

The proposed implementation of print server 240 is a PC/XT with an attached printer 242. The print file is read into the system and is stored as a file. The system prints the file by loading (or staging) it into main memory and executing the print routine of the Basic I/O System. This is just a programmed version of the Load filename: Print filename operator commands.

| UNIT | | Print Server |
|---|---|---|
| PrintFile | → | |
| | ← | Ack \| Nack |
| File | → | |

3. Switch—Intelligent Terminal Interface and Protocol

IBM's Synchronous Data Link Control (SDLC) was chosen as the data link control for the path between the terminal and the switch. Since inband control signaling was selected, this implies that SDLC is also the data link control scheme for the path between two terminals once a path is established through the switch.

The primary reason for choosing SDLC was that it is one of the data link protocols that can be implemented using Very Large Scale Integration (VLSI) components. The two main components needed are a data link protocol chip and a single chip microprocessor. The use of VLSI components leads to ease of implementation and lower implementation cost. As a bit-oriented data link protocol, SDLC has numerous advantages over more conventional byte-oriented data link protocols. The advantages include better data transfer efficiency, higher speed, and data transparancy.

Three SDLC message exchanges between the switch and the intelligent terminal are an integral part of the switch system design. These messages exchanges, Call Setup, Call Termination and Call Notification will be described in detail. In the following paragraphs, some explanatory information on SDLC is given. A description of the three message exchange is given after that.

SDLC Overview

The basic unit of data transfer in SDLC is the frame. The format of the frame is given below.

| Flag | Address | Control | Information | CRC | Flag |
|------|---------|---------|-------------|-----|------|
| ←8b→ | ←8b→ | ←8b→ | ←x bytes→ | ←16b→ | ←8b→ | b: bits

Flag: The flag is a unique 8-bit pattern (01111110) that specifies the beginning and end of the frame. The transmitting unit uses a zero-insertion algorithm to ensure that the flag pattern does not appear in the frame between the beginning point flag and the ending point flag.

Address: The 8-bit address field identifies the sender or destination unit dependent upon whether the sender is a primary unit or a secondary unit.

Control: The 8-bit control field defines the frame type and for some frame types contain additional data link control information.

Information: The information field contains the data. All frames do not have an information field. There is no architecture limit on the number of bytes in the information field, but it must be an integral number of bytes.

CRC: The CRC or Frame Check Sequence is a two-byte check code that is calculated over address, control and information fields. Most implemented CRCs are cyclic redundancy checks using a specified set of divisor polynominals.

In the exchanges between the switch and an intelligent terminal the switch will always be an SDLC secondary unit and the terminal will be a primary unit. Frames transferred from the terminal to the switch will have the switch address in the address field of the frame. Frames transferred from the switch to the terminal will have the switch port address in the address field of the frame. If each switch port and each intelligent terminal in the system have a unique SDLC address, then there will be no amibguity regarding address. The switch port is designed to respond to SDLC frames from one SDLC address. The intelligent terminal can receive frames from multiple sources but each source has a unique SDLC address. The unique address requirement limits the system size to 126 (128−2) terminals if the normal SDLC frame format is used and addresses 00 and FF are not used.

There are three SDLC frame format types. They are Information Transfer Format, Supervisory Format and Unnumbered Format. The three control message exchanges between a switch port and terminal are done using the Information Transfer Format. The format type is defined in the control field.

| 0 | Send Count N(S) | P/F | Receive Ct N(R) |
|---|---|---|---|

SDLC Control Field Format for Supervisory Frame

For the control messages, N(S)=001, P/F=1 and N(R)=001. The control field for the control messages will be 00011001.

The command messages are contained in the information field of the command message frames. The implementation described in this paper uses a one-byte information field.

| Command Code | PORT # |
|---|---|
| 7        4 3 | 0 |

Command Message Format

The higher four bits of the command are the command code. The commands used in the switch terminal exchanges are listed below:
Nack
Ack
Close
Service Request
 Open
 Call Waiting A one-out-of-four encoding is used. The Service Request command meaning is dependent on the source of the command.

The lower four bits, for the Service Request command, will contain the Port #. Although the invention is described with reference to a 15-port switch, note that be expanding to a large command field, e.g., two bytes, larger systems can be accomodated.

The Physical Interface

The preferred physical interface between a terminal and the switch port is a serial data path from the port to the terminal and a serial data path from the terminal and the port. The command exchanges between the terminal and the switch port are done in half duplex mode. The point-point established link between two terminals can be operated in either half duplex or full duplex mode.

The implementation uses an RS-232C interface. Translation between TTL logic signals and RS-232C logic levels may be done using Motorola devices MC1488 and MC1489.

The preferred implementation uses a form of a digital phase synchronization in which clocks are derived from the data stream. Such a synchronization method can be done in few hardware chips and is sufficient for moderate speed links. The hardware scheme is described in the hardware description section.

Message Exchange Scenario

When a person or a process at one intelligent terminal wants to establish a link to another intelligent terminal, a Call Setup exchange is used. The first step is that the requesting terminal (or agent acting on the terminal) sends a Service Request (Open) to its switch port. (A Service Request sent from a terminal to a switch port is the Open request). The Service Request contains the Switch Port Number of the requested terminal. The requesting switch port will communicate with the requested switch port in order to ascertain the availability of the requested terminal. (The switch port to switch port communications is an integral aspect of the switch design and is not considered a part of the terminal-switch interface). After determining the availability of the requested terminal, the switch port of the requesting terminal will send an Ack or a Nack to that terminal.

Figure 8:
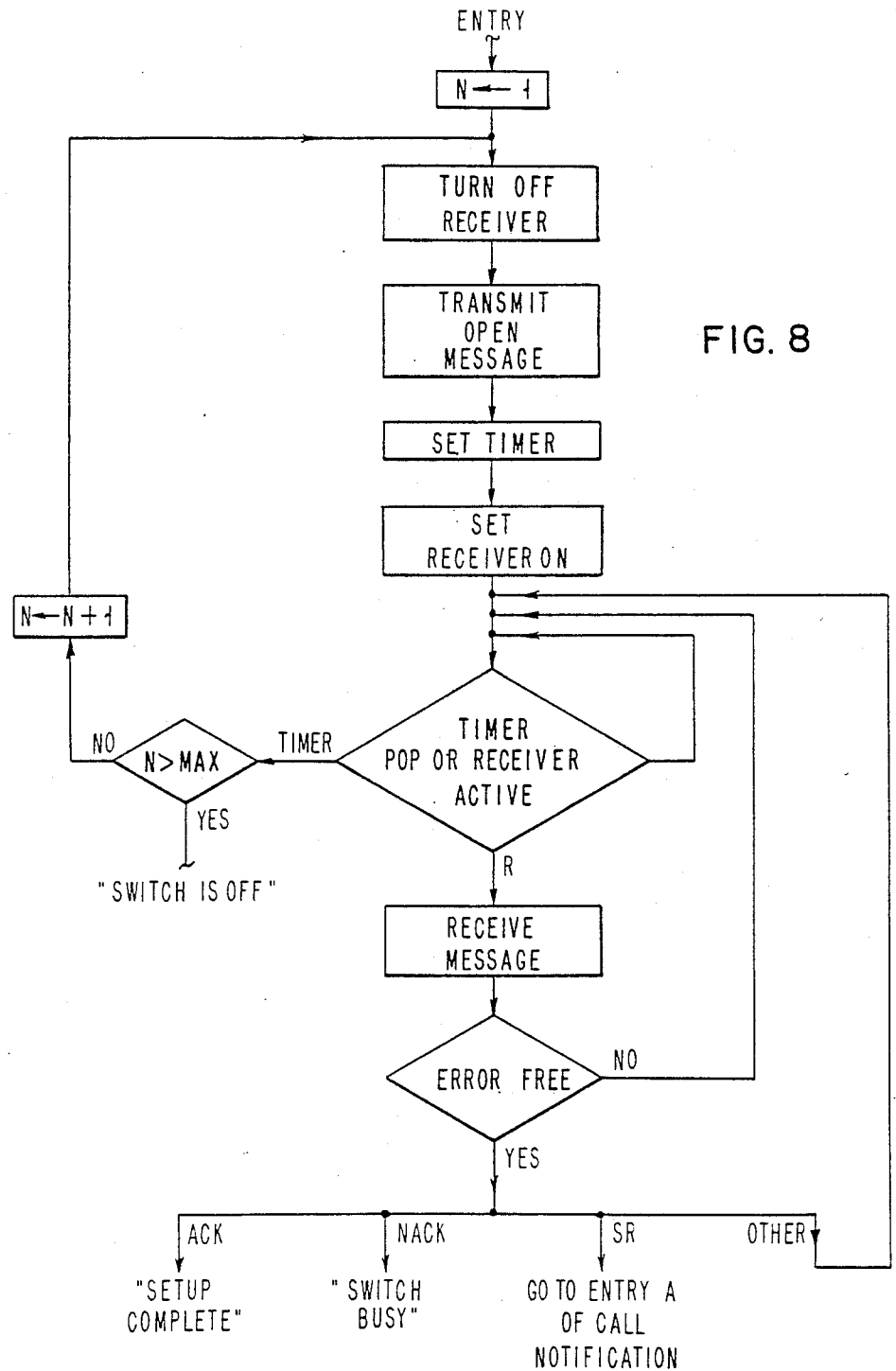
FIG. 8 is a flow diagram showing a call setup sequence according to the present invention.

A flow diagram of the Call Setup sequence from the perspective of the requesting terminal is given in FIG. 8. At the entry point, it is assumed that the Service Request message has been setup in some buffer area. After initializing the repeat transmission parameter N and turning off the receiver portion of the communications controller the Service Request message is transmitted in an information frame. At the conclusion of the transmission, a watchdog timer is turned on, the transmitter portion of the communication controller is turned off, and the receiver portion is turned on. At this point, the unit goes into a loop waiting for either the timer to expire or the start of frame reception. If the timer expires, then the unit assumes that the message is lost. If the number of retransmissions has not exceeded some maximum, Max, the original message frame is retransmitted. If the number of retransmissions exceeds Max, then the units returns a "Switch did not answer" response to the process.

If the start of frame reception is indicated, the unit goes into the frame reception routine. Any frame that does not pass the CRC check is discarded and the unit returns to the timer-receiver loop. Any error-free frame is examined. The expected frame contents are a Nack, an Ack or a Service Request (Call Waiting). All other frames are discarded and the unit returns to the timer-receiver loop. If the response frame is an Ack, the unit returns a "setup complete" message to the process. If it is a Nack, the unit returns a "setup not possible" response to the process. If the response message is a Service Request (Call Waiting), the unit jumps to the Entry A entry point of the Call Notification sequence. If the response message is none of these the unit goes to the point in the procedure where the receiver is enabled and falls through to the timer-receiver loop. The timer will eventually signal and the original Serivce Request (Open) is retransmitted.

Figure 9:
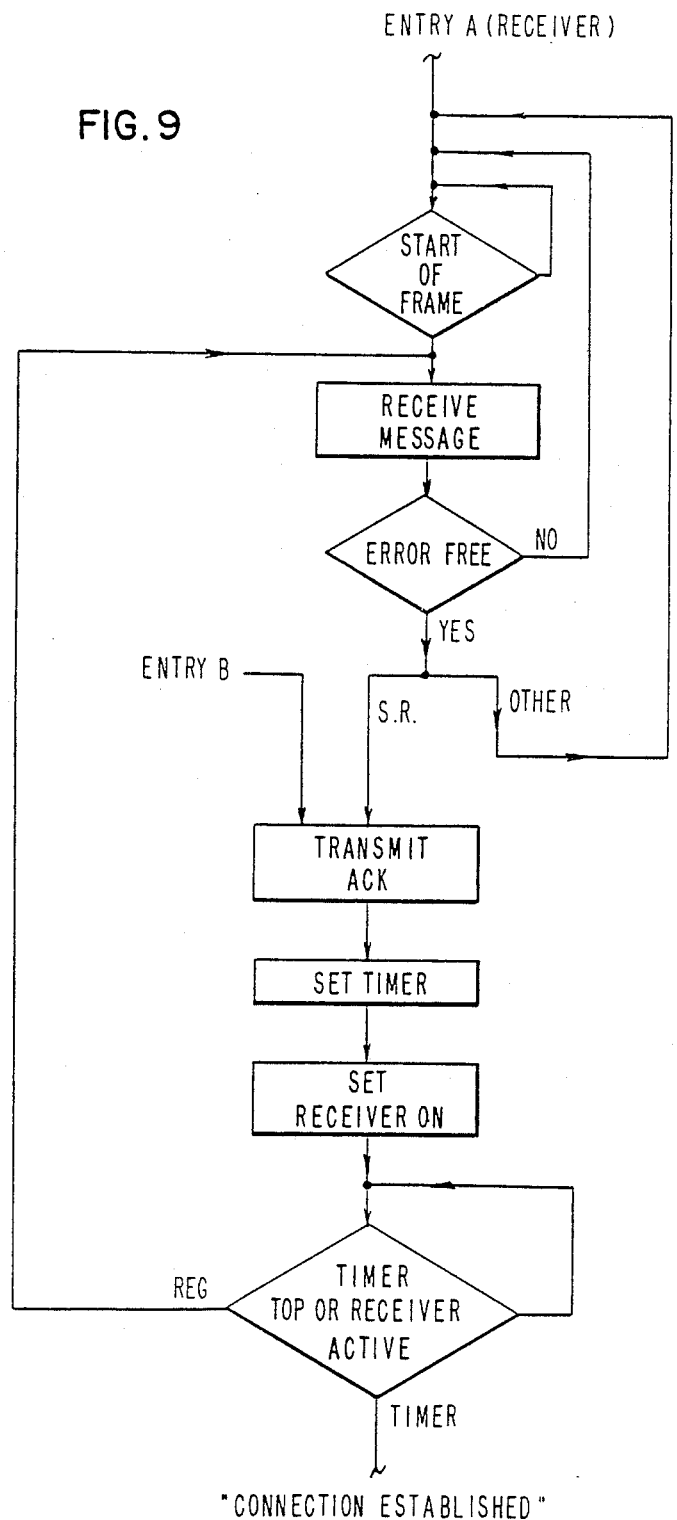
FIG. 9 is a flow diagram showing a call notification sequence according to the present invention.

The flow of the Call Notification procedure is given in FIG. 9. A terminal that has an active connection to the switch but is not engaged in a conversation has its unit in a loop looking for a start of frame indication (this implies that that the receiver is active). When the start of frame indication is positive, the frame is assembled and an error analysis is done. All erroneous frames are discarded and the unit returns to the entry point. The only valid message is a Serivce Request (Call Waiting). The reception of any other message causes the unit to return to the entry point. If a Call Waiting message is received, an Ack is transmitted to the switch port.

After the transmission, the unit sets the timer on and sets the receiver on and goes into a timer-receiver loop. If the start of frame indication goes positive, the unit to the point in the procedure labeled AGAIN. If the Ack arrived in error, the switch port will time out and retransmit the original Call Waiting request. If the Ack arrived error-free, the unit's timer will eventually signal and the unit can return "you are connected to Port z" to the terminal process. Note that z is obtained from the Port# field of the Call Waiting message.

*As a part of the path establishment protocol, after the path is established the first message is sent by the called terminal. The timer setting in the Call Notification procedure should reflect worst case estimates to ensure that the calling terminal has received the Ack from its switch port and is set up to receive the first message.*

Figure 10:
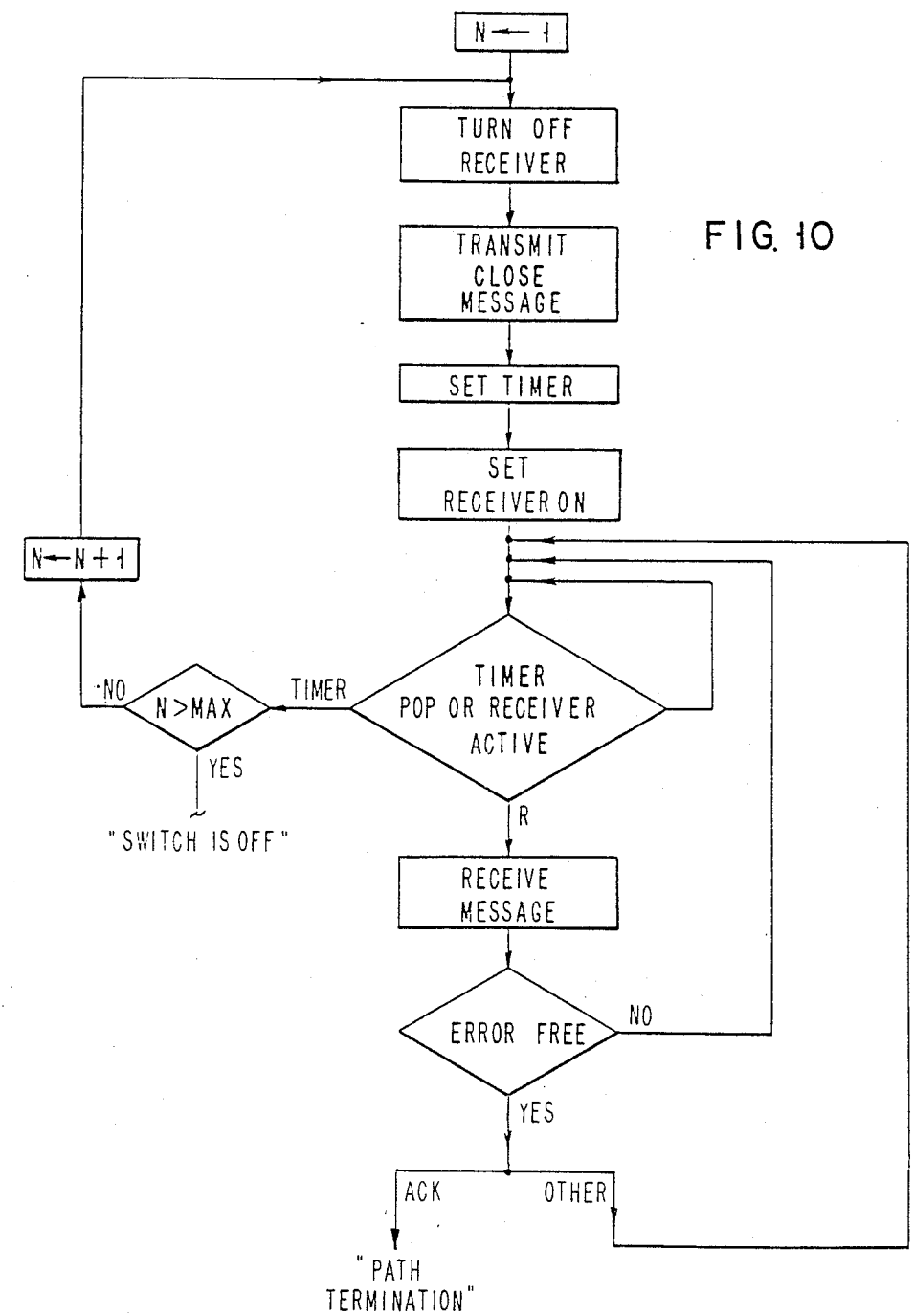
FIG. 10 is a flow diagram of a call termination sequence according to the present invention.

The Call Termination exchange is very similar to the Call Setup exchange (see FIG. 10). Instead of an Open command, the terminal sends a Close command to its switch port. Each of the two terminals on an established path is responsible for sending the Close and verifying the proper completion of the exchange. It is possible for one terminal to properly terminate and the other terminal not terminate properly. The properly terminating terminal's switch port will be in a state to process other path setup requests. *Note that both terminals (or cooperating processes at the terminals) must know when the end of the conversation is reached.*

4. Switch Design

In this section, the switch design is described in detail. The Clock Module, the Backplane Bus, and the Port Module are described individually. The last part of this section describes the interaction between two ports within the switch in carrying out the path connection and path disconnection.

The Clock Module

Figure 11:
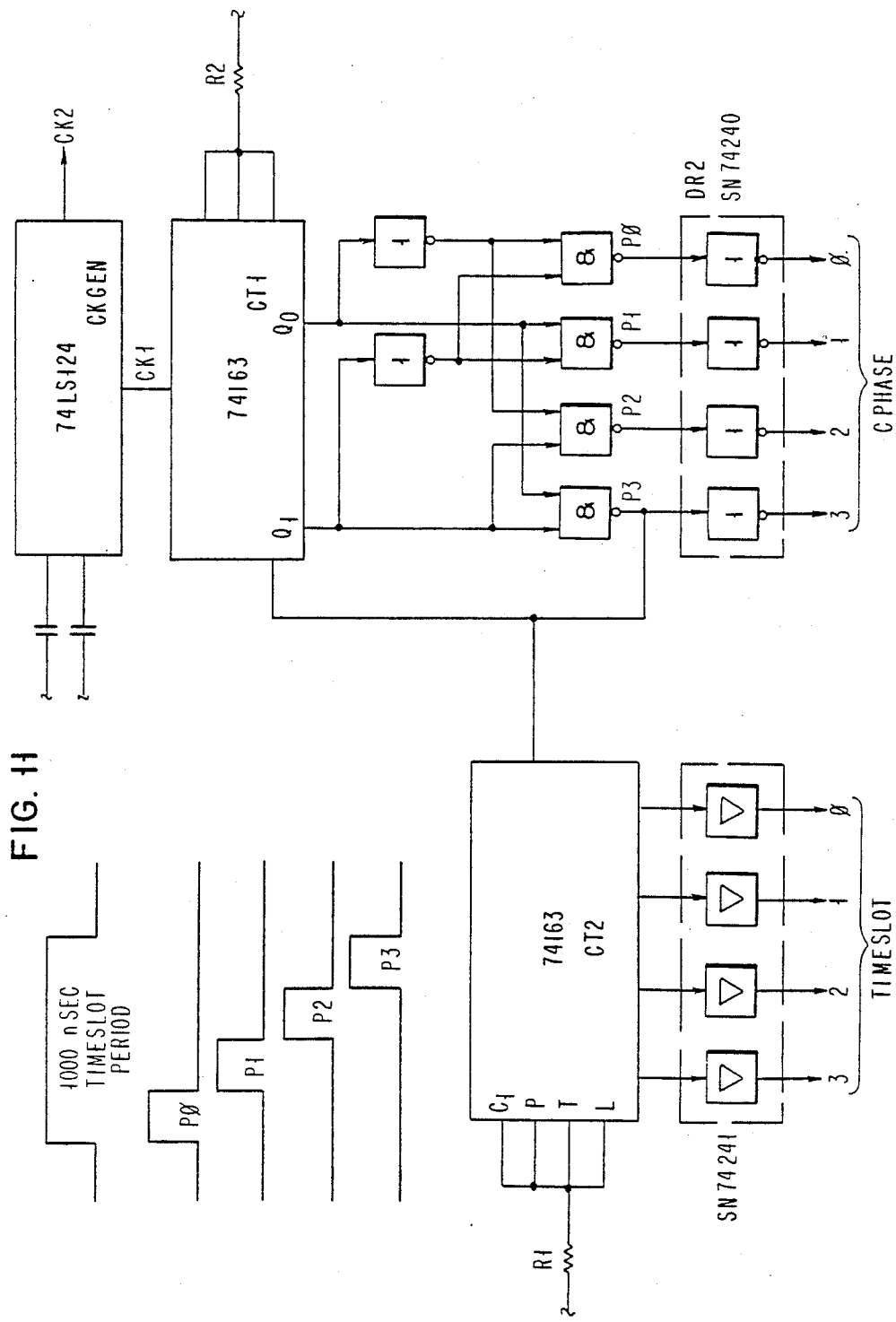
FIG. 11 is a diagram of logic and timing for a clock module to be employed with apparatus according to the present invention.
Figure 12:
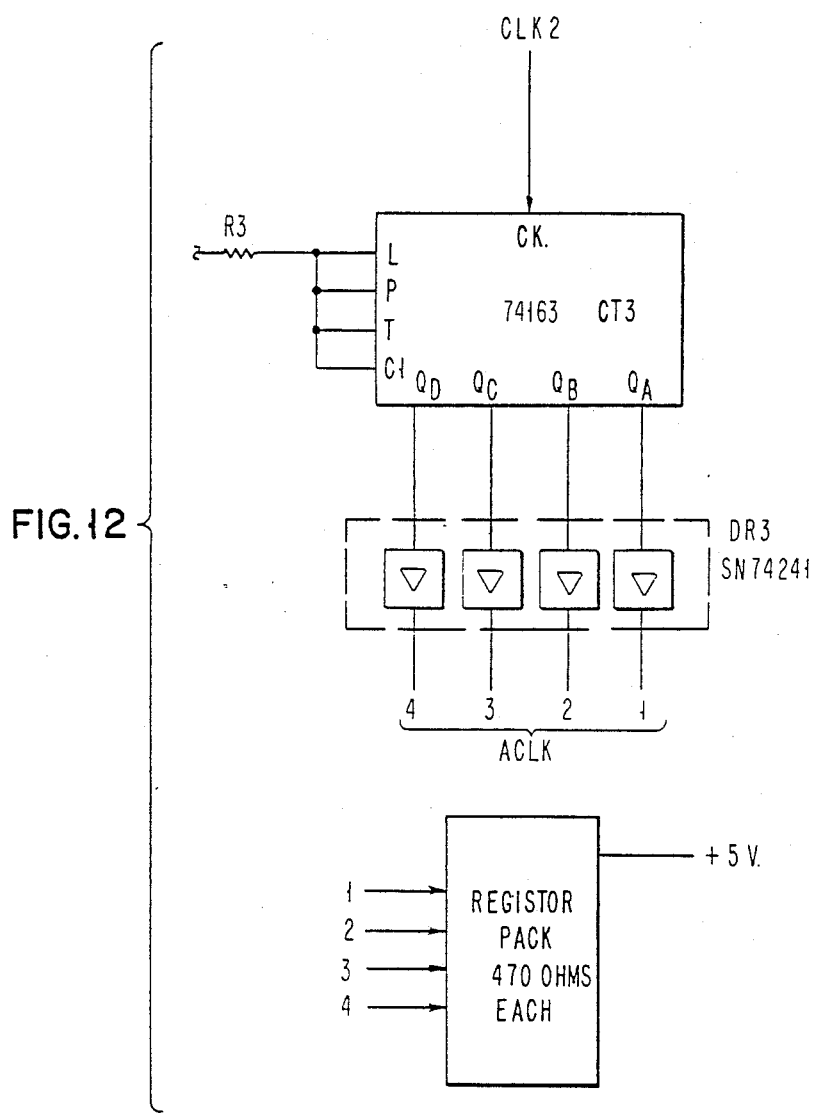
FIG. 12 is a logic diagram of additional circuits of a clock module to be employed with apparatus according to the present invention.

There is one Clock Module per switch. A common set of clocks and timing signals that are used by the ports is generated on the Clock Module. The Clock Module (CM) 170 hardware is shown in FIGS. 11 and 12.

The primary clock signals are the outputs CK1 and CK2 of CKGEN, a SN74LS124 voltage controll oscillator. CKGEN contains two independent vco's. The frequency of the output of a voltage controlled oscillator is a function of the voltage of two control inputs and the value of an external capacitor. In this embodiment, the two control inputs are tied to +5 v through a 470 ohm resistor. One of the output signals, CK1, is a 250 nsecond, 50% duty cycle clock signal. The other output signal, CK2, is a 1630 nsec, 50% duty cycle clock.

The 250 nsec clock signal, CK1, is the clock input to a CT1, a SN74163 4-bit binary synchronous counter. The Q0 and Q1 outputs of CT1 are inputted into the inverter-nand network shown. Q0 is the low-order counter output. The output of the Nand gates are labeled P0, P1, P2, and P3. Pz is low when the Q1Q0 pair is the binary integer representation of the decimal number z. The signal P3 is fed back as the Clear input to CT1. Since CT1 is a synchronous counter, the first input clock after P3 goes low causes the counter to be set to $Q_i=0$, for all i. DR2 is an SN74240 hex inverting bus driver. Each Pi, i=0,1,2,3, is inputted into an inverter element of DR2. The inversion of Pi becomes Cphasei. Each Cphase_i signal is a 1000 nsec, 25% duty cycle clock, they differ only in phase.

P3 is the clock input to CT2, an SN74163. The '163 control lines (Clear, L, P, and T) are set up so that it is a free running counter. Since CT2 is a four-bit counter, its four outputs sequence through the states 0, 1, 2, ... 15, 0. Since the input clock to CT2 is a 1000 nsecond clock, each output state lasts for 1000 nseconds. Each CT2 output state defines a timeslot. Each output of the CT2 is inputted to an element a SN74240, a noninverting line driver. The line driver outputs are labeled Timeslot0, ..., Timeslot3; they are the binary encoding the timeslot number. This design is a 16 timeslot design. Each timeslot is 1000 nsec in duration.

The output of the second vco on CKGEN is labeled CK2. CK2 is a 614400 Hz clock (1.6276 microsecond period). CK2 is the clock input to CT3, a SN74163 counter. The controls of CT3 are set up to make CT3 a free running counter. The outputs of CT3 are therefore clocks of the following frequency:

Q0: 614400 Hz
Q1: 307200 Hz
Q2: 153600 Hz
Q3: 76800 Hz

One of these clocks is used by a port to derive the transmit and receive clocks. Providing multiple clocks is a matter of practical implementation. The chosen frequencies ensure that the switch can be operated at standard modem frequencies.

The Qi outputs of CT3 are inputted to DR3, an SN74241 noninverting line driver. The outputs of DR3 are ACLKi, i=0,1,2,3. ACLKi is the logic equivalent of Qi.

The Backplane Signals

The backplane signals are basically a common bus to the modules of the switch. The switch modules are the Clock Module and the Port Modules. The definition of the backplane signal lines are given below.

RDi

The received serial data stream transmitted from Terminal_i to the switch is labeled RDi. In the Port Module, RDi is fanned out to the backplane. There is one RD line in the backplane for each unit that is connected to the switch.

Cphase <0..3>

These signal lines are generated in the Clock Module and are inputted through the backplane by each Port Module. Cphase signals are clock signals that are at the time slot frequency but at a distinct phase relevant to the time slot. Cphase signals are used by the Port Module as clock control signals that insure that certain Port control actions occur relative to the beginning of the time slot.

Timeslot<0..m>

Timeslot<0..m>(TS) are generated in the Clock Module and are inputted through the backplane by each Port Module. TS defines which time slot is currently active.

Databus<0..h>

The Databus portion of the backplane is shared by all of the Port Modules. All Port Modules are constantly monitoring the Databus portion using dedicated hardware. During any one timeslot, only one Port Module can drive the Databus. The contents of the Databus<0..h> during a timeslot is the port_number of the Port Module that is the object of a connection request. The Databus portion will contain the same number of lines as the Timeslot portion.

Ack

This is a single line which can be driven by and is received by each Port Module; however, only one Port can drive the line at any one time. This line is used by the requested Port Module to answer yes to a connection request.

Nack

This is a single line which can be driven by and is received by each Port Module; however only one Port can drive the line at any one time. This line is used by the requested Port Module to answer no to a connection request.

The Port Module (See FIG. 4)

The port control algorithms are implemented using a single-chip microcomputer system. The micro 400 controls the 16-1 multiplexer 402, the 2-1 multiplexer 404, the Port Bus logic 406 and the communications control chip 408.

Figure 13:
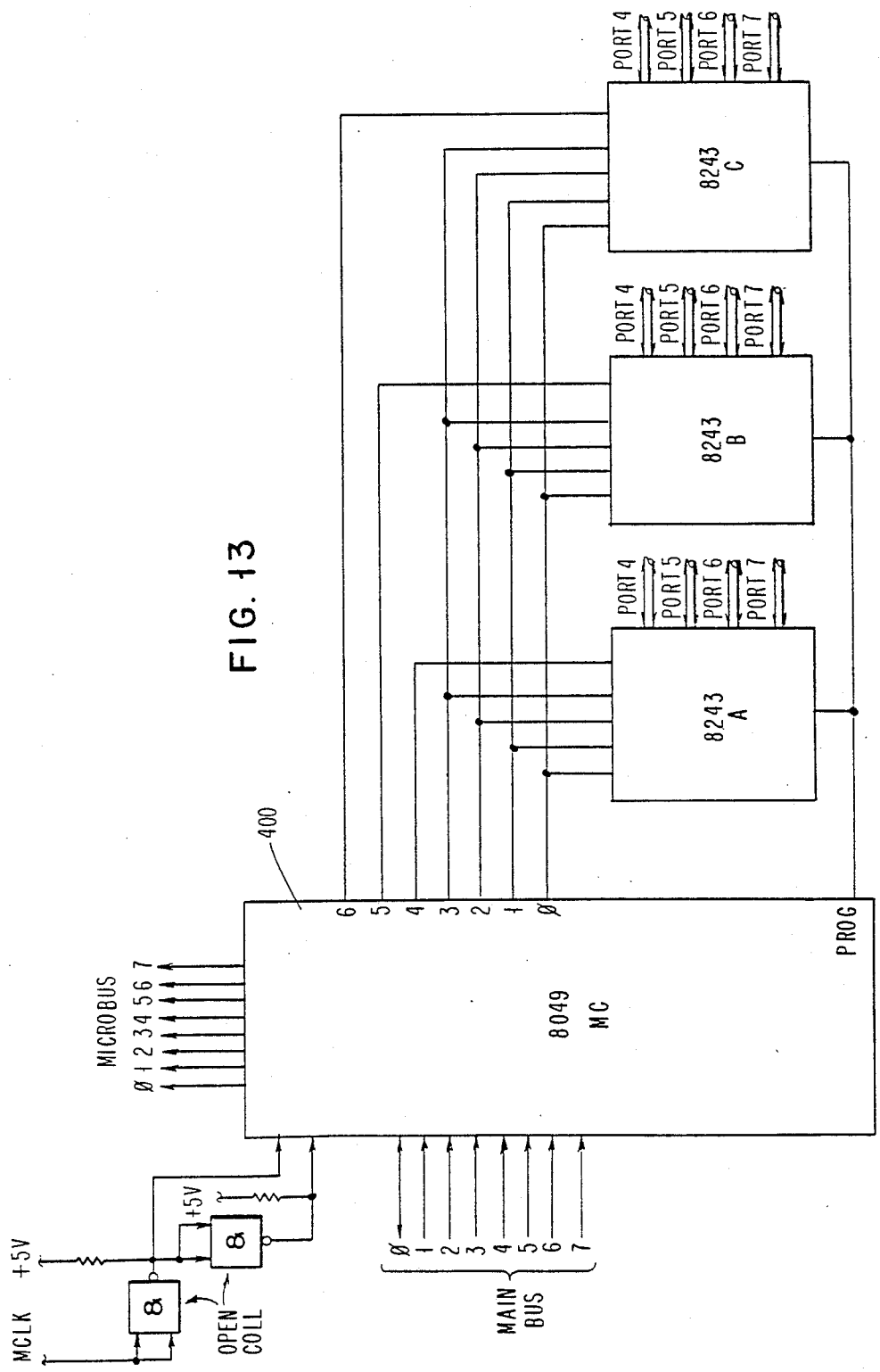
FIG. 13 is a logic diagram of a microprocessor control system for a port module according to the present invention.

The microcomputer system 400 is shown in FIG. 13. Factors such as cost and the nature of the control algorithms led to the selection of the Intel 8049 single-chip microcomputer as the control element for the port. The 8049 is a member of the 8048 architecture family and has 2 Kbytes of ROM, 128 bytes of RAM and 27 I/O lines. The basic instruction cycle is 1.4 microseconds.

The 27 I/O lines are not enough for this application. The effective I/O can be expanded using the Intel 8243 I/O expander. This part is specifically provided by Intel to extend the I/O capabilities of the 8048 family of microcomputers. Three 8243s, 8243A, 8243B, and 8243C are used. There is a standard way to interface the I/O expanders to the 8049 (MC).

MCLK is a 10 Mhz clock that is generated on the Clock Module and is distributed via the backplane to all Port Modules. MCLK is input to a network of open collector NAND gates to form the clock inputs to the 8049 microprocessor. The microprocessor (MC) generates all of its internal clocks from the two clock inputs.

The 8-bit Port_2 of MC is labeled Microbus and serves as the connection to the databus of the communications controller chip COM. The main databus of MC is labeled Main Bus.

The I/O lines of the 8243s are organized as four 4-bit ports. There are specific microprocessor instructions for I/O to and from a port. The connection between the 8243 I/O Expanders and the MC is done in a manner suggested by the Intel Corp. manuals referred to above. FIG. 14 relates the names of port control signals to specific port lines.

Figure 15:
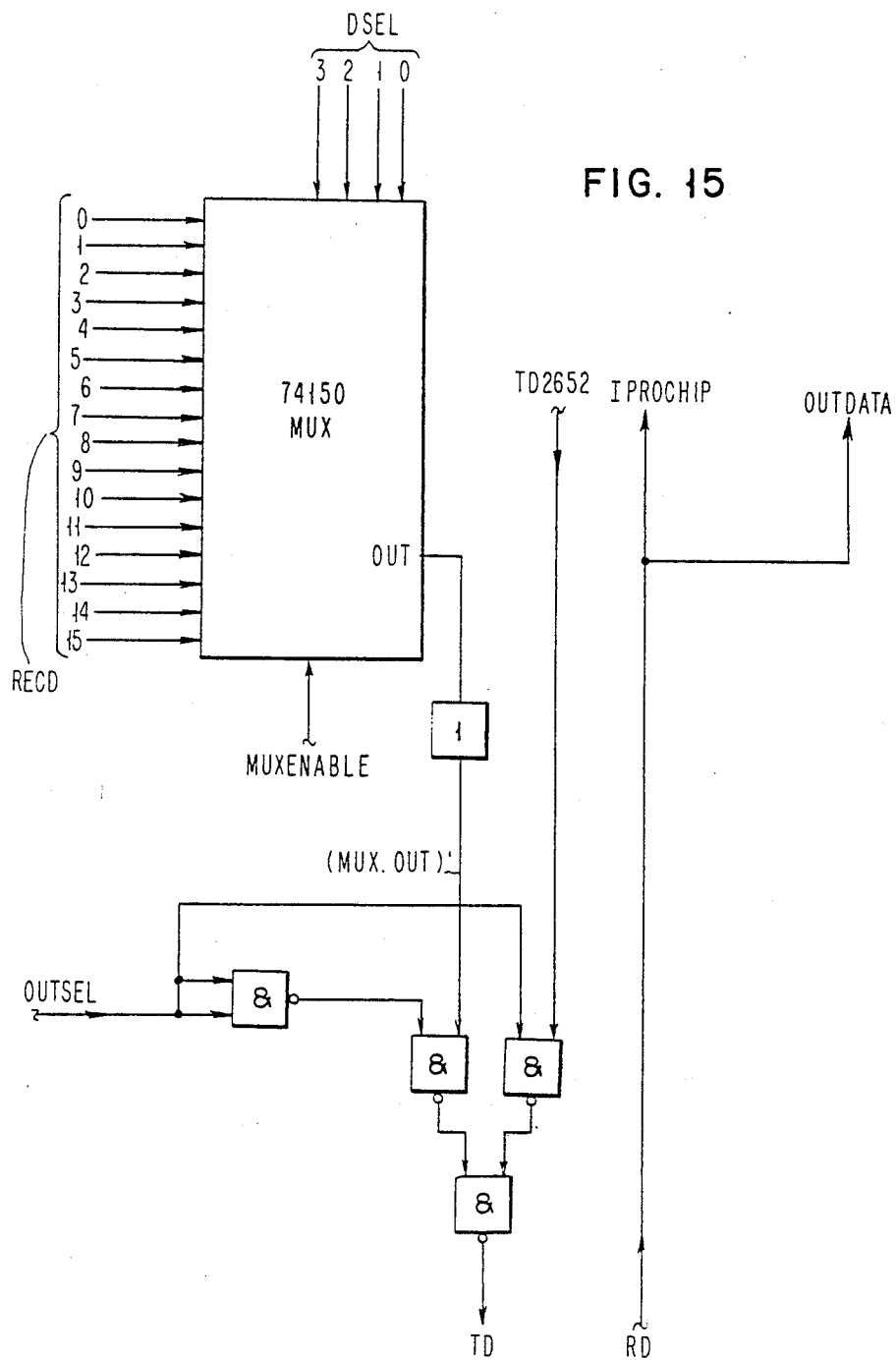
FIG. 15 is a logic diagram of a port data traffic switching circuit according to the present invention.

The link between the switch port and the terminal is assumed to be composed of two serial links, one for data transmission in each direction. A single line link is not prohibited, however, such a link will require more complex link interface hardware than a two line implementation. In describing the switch design, we label the serial data stream from the terminal to the switch port as RD. The reverse serial stream is labeled TD. See FIG. 15 for the description that follows.

At the switch port, the RD stream is fanned out as two separate but identical data streams. IPROCHIP becomes the received data input to the communications controller COM. OUTDATA is outputted from the port to the backplane where is is accessible to all ports.

The OUTDATA line from Port_i is labeled RECDi on the backplane. Each RECD line is inputted to each port. In the port, each RECD line is inputted to a SN74150, a 16-1 multiplexer. The multiplexer is labeled MUX. The multiplexer MUX is controlled by the microprocessor MC through the multiplexer enable line MUXENABLE and the data selection lines DSEL<0..3>. The MUX output is the logical inversion of the selected input, so MUX.Out is inputted to an inverter.

There are two potential sources for the link stream TD. In one mode, the switch port communicates directly with its associated terminal. In this mode, the micro-controller MC uses the communications controller COM in the COM's transmit mode. The serial stream that flows from COM is labeled TD2652. In the other mode, the two terminals are communicating directly and the output signal (MUXOUT)' is the logical equivalent of the selected RECD line.

Quad Nands, an SN7400, are interconnected to form a 2-1 multiplexer with the OUTSEL as the select signal. OUTSEL is a micro-controller signal.

When the switch port is communicating directly with its associated terminal, OUTSEL is set high. In such a state, TD becomes logically equivalent to TD2652. When the terminal associated with the switch port is communicating directly with another terminal, MUX is enabled ON and OUTSEL is set low. MUX's data select lines are set to appropriate values to effect the selection of the desired RECD data stream. In such a state, TD is logically equivalent to the selected RECD stream.

In the described invention, all links are assumed to operate at the same data rate, however, this does not have to be single master clock system. At any one time, only the two elements that are communicating directly need be in synchronization.

Figure 16:
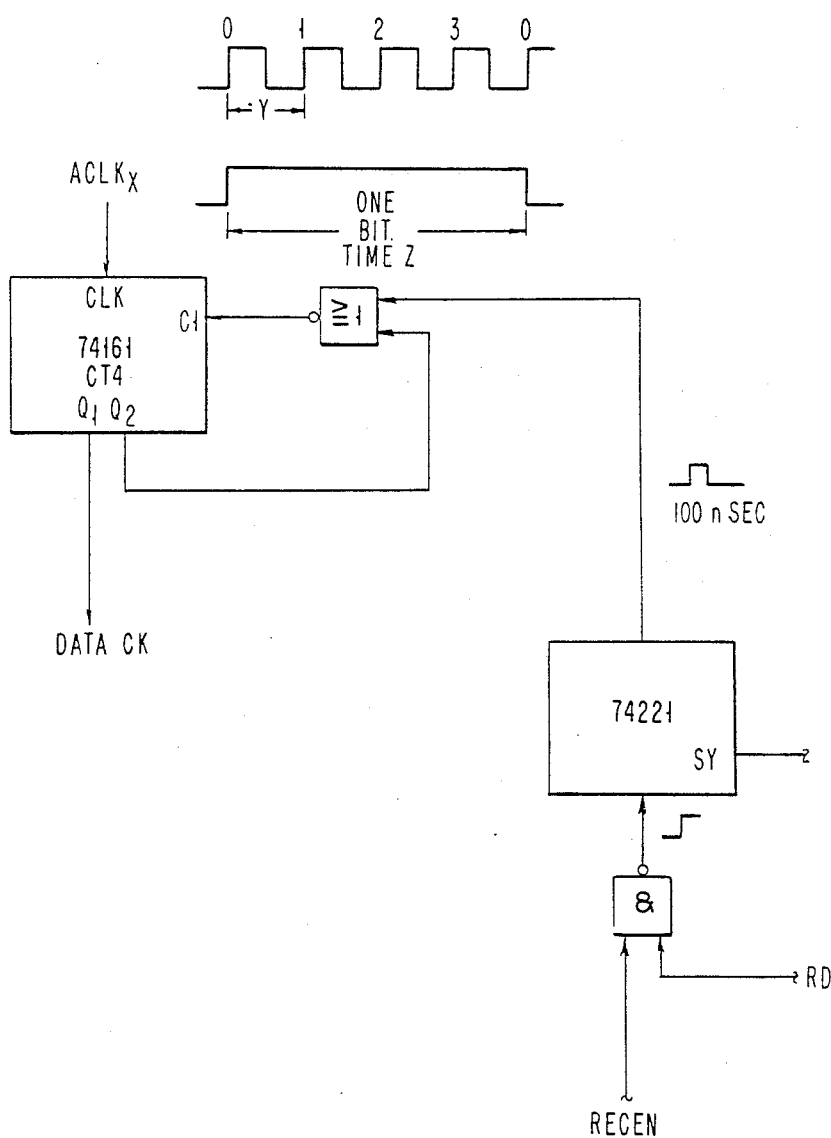
FIG. 16 is a diagram of logic and timing for a switch port data synchronization circuit employed with apparatus according to the present invention.

FIG. 16 shows the data synchronization circuitry that is present in the switch port. CT4 is an SN74161, a four-bit counter with asynchronous clear. ACLKx is one of the four ACLK clocks generated in the Clock Module. Based on the desired link speed and the considerations to be explained, one of the ACLK clocks is chosen as the wired-in clock input to CT4. If the ACLKx clock has period Y, the bit period is Z (=4*Y). Z is the period of the clock signal DATACK which is the Q1 output of CT4.

The signal line RECEN is controlled by the micro-controller MC and is set high when the switch port is in the receive mode and is set low when the switch port is in the transmit mode.

In the transmit mode, the output of SY is low and the input to CT4 CLR becomes the logical inversion of the Q2 output of CT4. Since the clear input of CT4 is active low, a CT4 clear is generated when the Q2 output of CT4 goes high. CT4 is a modulo 4 counter in the switch port transmit mode. DATACK has a period four times that of ACLKx and a frequency one-fourth that of ACLKx.

SY is a SN74LS221, a dual monostable multivibrator with Schmitt-trigger inputs. In the receive mode, a 100 nanosecond high pulse is generated on the Q1 output of SY whenever there is a 1-to-0 transition on the RD line. The resulting pulse acts as a clear to CT4. The effect is to (re)establish the bit transition as the beginning of a bit period. DATACK is both the transmit and receive clock for the switch port. As the receive clock it serves as the sampling clock for the incoming bit stream. The re-sychronization scheme forces the sampling time to the center of the bit period. On an SDLC data link, a long string of 0's can cause loss of synchronization At 1 Mbps and with clock deviation of 5%, synch can be loss with a string of 19 or more 0's. However, this will result in a detectable error. The primary effect is lowered link throughput.

The port logic interfaces to the Port Bus and is controlled by the micro-controller. The port logic operates asynchronously to the micro-controller. In this way, port requests are handled much faster than they would if port micro-controllers interacted directly.

Figure 17:
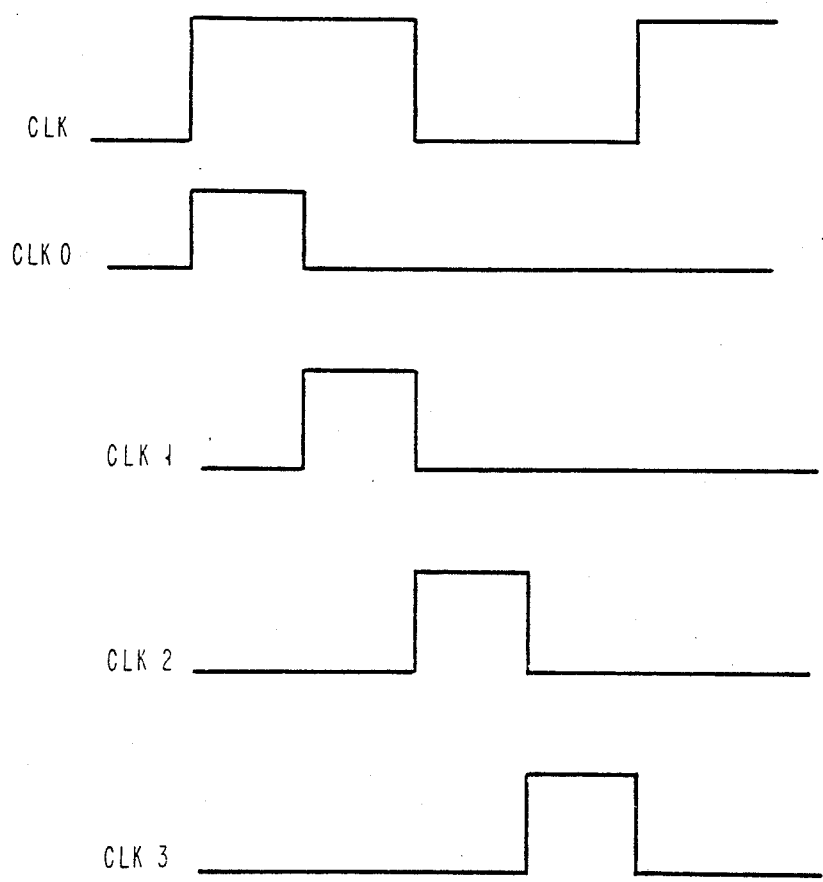
FIG. 17 is a clock timing diagram according to the present invention.

Once the port logic is set up by the micro-controller, certain port logic control actions occur automatically during an active time slot. A time slot is active, relevant to the port, if the port either makes a request during the time slot or is requested during the time slot. The control actions during an active time slot occurs at specific time points defined by the clock phases which repeat for each time slot. (See FIG. 17). There are four clock phases during each time slot. The phases are called CLOCK0, CLOCK1, CLOCK2, CLOCK3.

In defining the actions of the port logic, it is necessary to define an initial state that the port logic is assumed to be in. Initial State:

The two flip-flops of the dual negative edge triggered unit FF should be reset. The named state signals RSSTATE and RCSTATE should be low. The SETACK line, 8243A Port 5 Line 2, should be set to 0 (No) or 1 (Yes).

Figure 18:
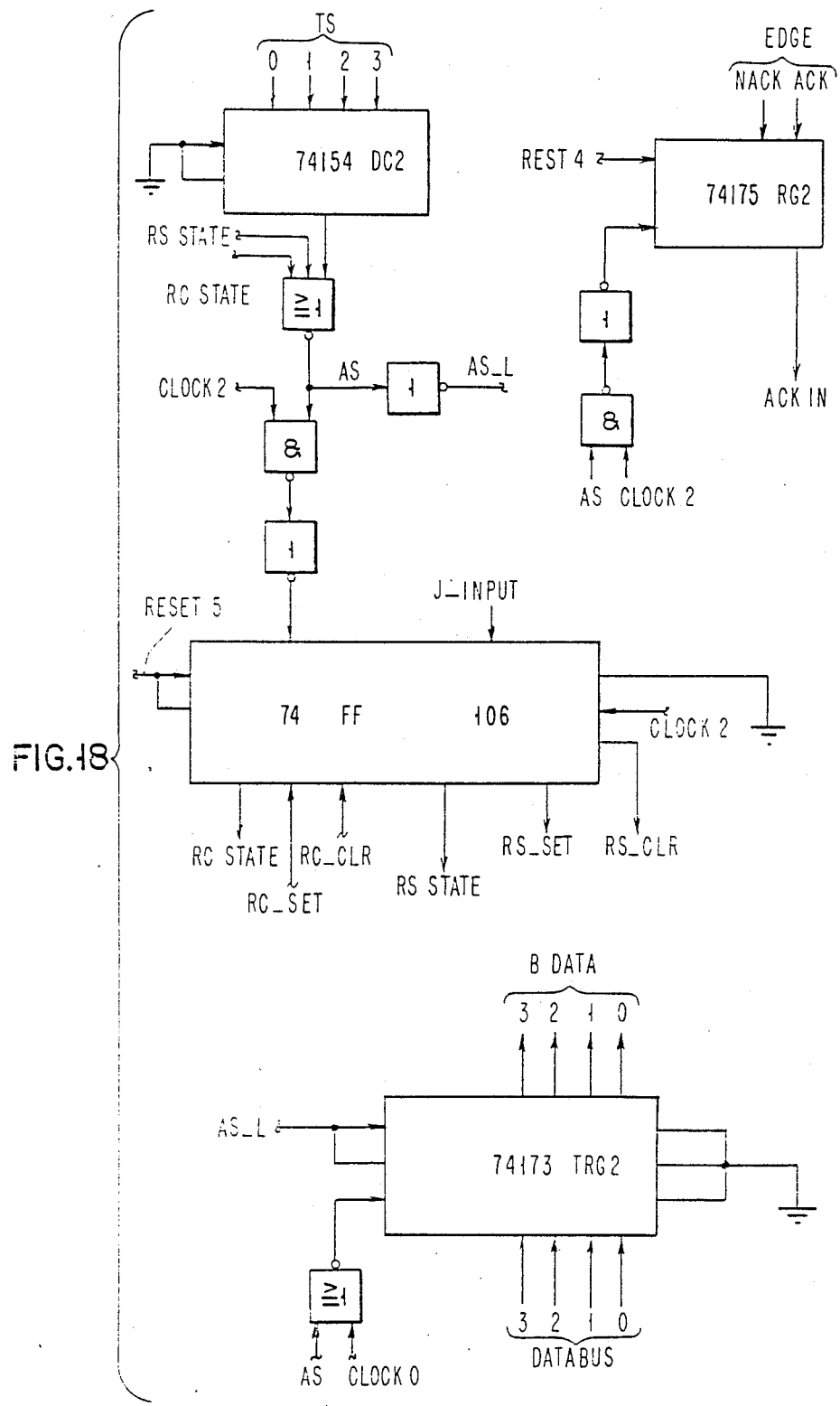
FIG. 18 is a logic diagram of a first part of port bus interface logic according to the present invention.
Figure 19:
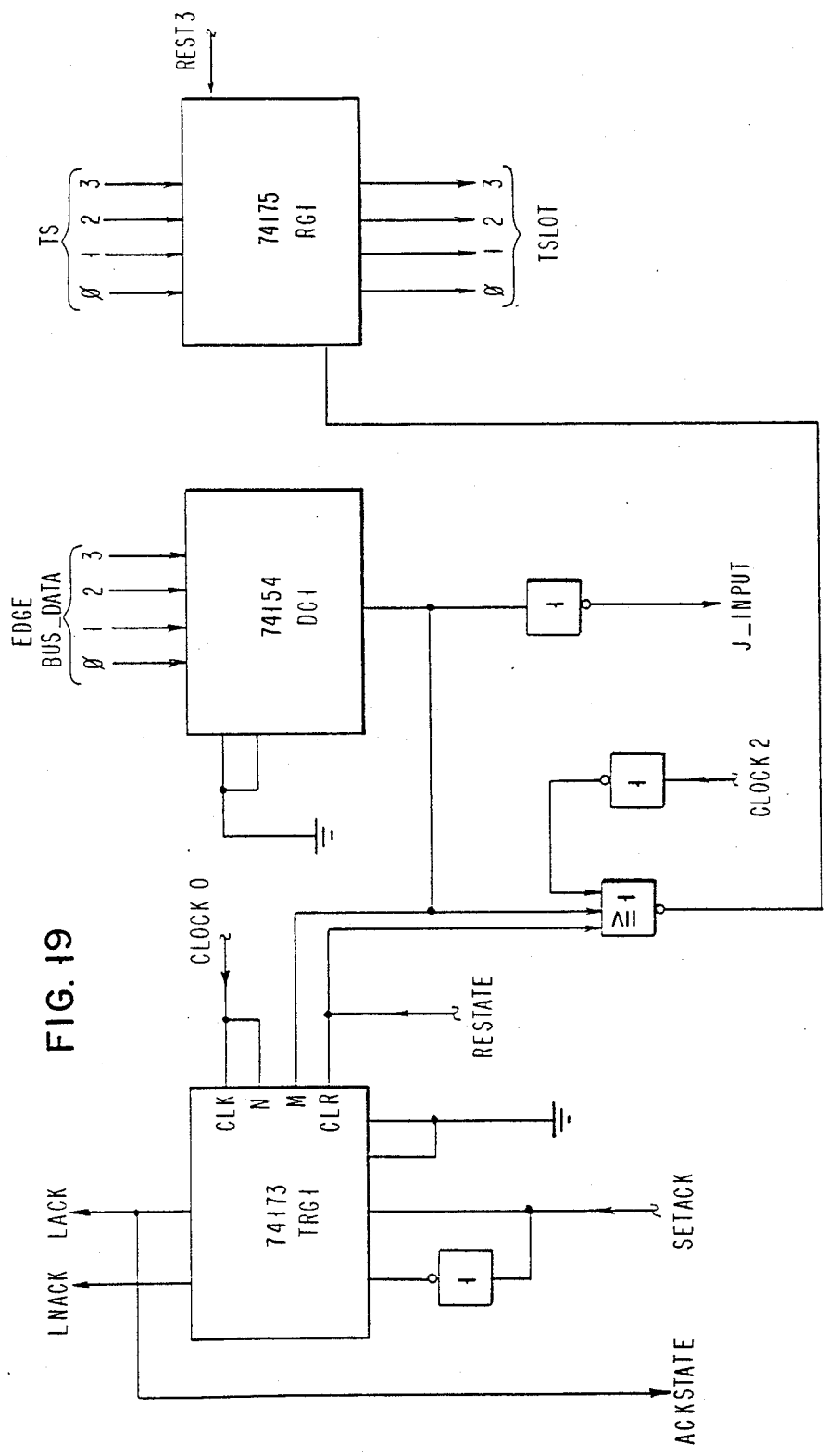
FIG. 19 is a logic diagram of a second part of port bus interface logic according to the present invention.

The port logic is shown in FIGS. 18 and 19. The port logic can be viewed as consisting of two parts; one part that is used primarily when the port is requesting a switch path connection with another port and the other part used primarily when the port is the object of a request.

The logic in FIG. 18 is the requesting logic. When a port, Port_Asking, wants to request a switch connection with another port, Port_Asked, Port_Asking loads the register TRG2 with the binary port number unique to Port_Asked. To do this, Port_Asking places this number on the Port 4 lines of 8243B. The data DATABUS<0,1,2,3> is automatically loaded into the register TRG2 on the falling edge of CLOCK0 during every inactive slot. Both RSSTATE and RCSTATE must be off(low)(0).

The only port that can make a request during a timeslot is the port whose port number is the same as that timeslot number. Port 3, and only Port 3, can make a request during Timeslot 3. Refer to FIG. 18 for the following descriptions. DC2 is a 4-input decoder. One of the sixteen output lines will go active low in response to a 4-bit code on the input lines. The Timeslot lines are inputted to DC2. The corresponding output line, which is active low, is input, along with RSSTATE and RCSTATE, to a NOR gate. The output of the NOR is labeled AS. When the timeslot for this port comes along and FF is initialized, AS goes high. The falling of CLOCK2 during this timeslot will set the RCSTATE flip flop. The state RCSTATE=high is taken by the microprocessor as the indication that the request timeslot has passed.

The transition AS low→high causes the contents of the register TRG2 to be placed on the backplane on lines BDATA<0,1,2,3>. This is the port number of the requested port. AS also enables the clock input to be passed to the register RG2. The rising edge of CLOCK2 causes the NACK and ACK backplane lines to be read into RG2. This is the Yes or No answer from the requested port. The answer, encoded on the ACKIN line, is passed to an input port of 8243B.

The following discussion relates to the logic shown in FIG. 19. Let us assume that the requested port is initialized and is set up to answer Yes to an request.

Port_Asking places the port number of the requested port on the BUS_DATA backplane lines. The BUS_DATA lines are inputs to the decoder DC1. The corresponding output line is input to an inverter, whose output J_input is the J input to the RS flip flop. Thus, under the assumed conditions, RSSTATE goes low→high on the falling edge of CLOCK2 during the timeslot that the port is requested.

The low to high transition of the output of the three input NOR causes the timeslot code to be read into the register RG1. An examination of the inputs of the NOR reveals that this happens on the rising edge of CLOCK2 during the timeslot of the request.

TRG1 has been preloaded with the answer to the request. The SETACK line is a microsystem output and is set to high(Yes) or low(No). TRG1 is loaded on the edge rising of CLOCK0. The outputs of TRG1 are in the high impedance state unless the M and N pins are both low. FIG. 19 shows that the conditions (1) not clock phase 0 and (2) port is requested cause logic signals to be placed on the LNACK and LACK backplane lines.

Note that if RSSTATE is high the clock is not passed through the NOR. This ensures that a port can only undergo one request from an initialized state. Note also that if RSSTATE is high, the register TRG1 is cleared. This causes the L(N)ACK lines to be low, resulting in a No answer to future requests until the port logic is initialized again.

Figure 20:
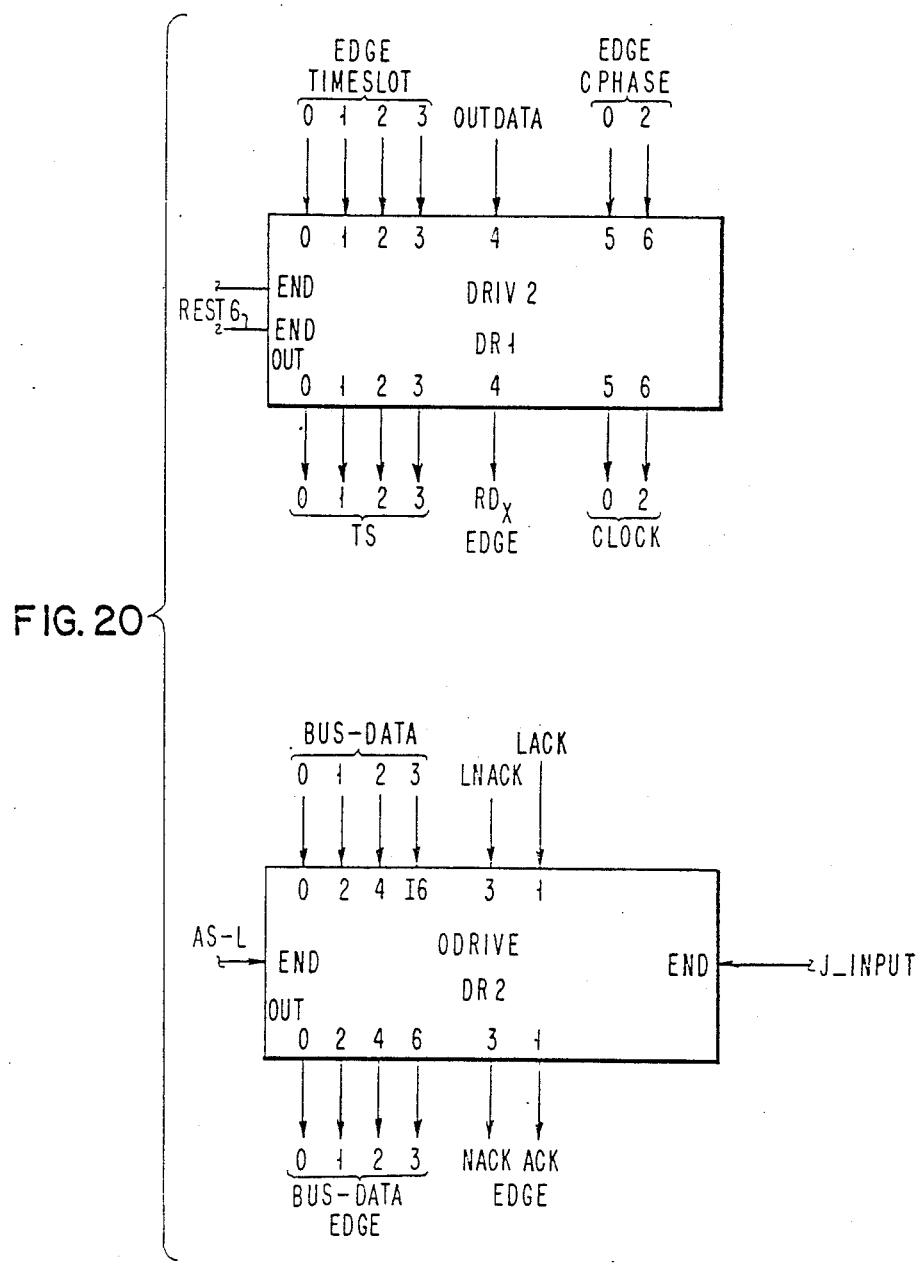
FIG. 20 is a logic diagram of a back plane interface according to the present invention.

FIG. 20 shows the backplane interface logic. DR1 is the buffer chip for the signals coming from the backplane into the port. DR2 is the driver chip for the signals that go onto the backplane from the port. DR2 consists of two independently enabled 4-bit registers. The BDATA lines are outputted to the backplane during a port requesting timeslot and are controlled by the AS signal. The L(N)ACK lines are outputted to the backplane during a port requested timeslot and are controlled by DC1 decoder output.

Thus, while the invention has been described with reference to preferred embodiments thereof, it will be understood by those skilled in the art that various changes in form and details may be made without departing from the scope of the invention.

What is claimed is:

1. A system for connecting a plurality of intelligent terminals to each other through a central non-blocking switch to a partitioned general purpose memory, said system comprising: a plurality of intelligent terminals; one or more storage units partitioned into a plurality of shared modules, there being at least one of said modules for each of said terminals; said central non-blocking switch connecting said plurality of intelligent terminals to said storage units, said switch controlling communication between any of said terminals, such that after initiation of communication between any two of said plurality of terminals point to point non-multiplexed communication channels are established between said any two communication terminals via said non-blocking switch, and between any of said terminals and one or more of said shared modules.

2. A system according to claim 1, further comprising: one or more service processors connected to and accessed through said central switch by one or more of said intelligent terminals.

3. A system according to claim 1, wherein said central switch further comprises: a plurality of ports there being at least one port for each intelligent terminal and one port for said storage unit.

4. A system according to claim 1, wherein said central switch further comprises: clocking means for providing timing signals to said ports, said terminals and said storage unit to control the operation thereof.

5. A method for connecting a plurality of intelligent terminals to each other and through a central non-blocking switch to a partitioned general purpose memory and to one or more service processors, said method comprising the steps of: partitioned one or more storage units into a plurality of shared modules, there being at least one of said modules for each of said terminals; and controlling communication between any of said terminals and one or more of said shared modules, such that after initiation of communication between any two of said terminals point to point non-multiplexed communication channels are established between said any two communication terminals via said non-blocking switch and between any of said terminals and one or more of said service processors by said central non-blocking switch connecting said plurality of intelligent terminals to each other and to said storage units.

6. A method for connecting a plurality of intelligent terminals to each other and to other networks through a central non-blocking switch to a partitioned general purpose memory and to one or more service processors, said method comprising the steps of: partitioning one or more storage units into a plurality of shared modules, there being at least one of said modules for each of said terminals; and controlling communication between any of said terminals and one or more of said shared modules, such that after initiation of communication between any two of said terminals point to point non-multiplexed communication channels are established between said any two communication terminals via said non-blocking switch and between any of said terminals and one or more of said service processors by said central non-blocking switch connecting said plurality of intelligent terminals to each other and to said storage units.

7. The method, according to claim 6, further comprising the steps of: dividing each of said shared modules into at least two sections, one section being a mail box and another section being a file box, for one of said terminals; controlling with said central switch message and file communication between said terminals, and between said terminals and one or more gateways, file servers, and print servers.

8. The method, according to claim 7, further comprising the step of: controlling message exchange between a first terminal and a mail box assigned to a second terminal.

9. The method, according to claim 7, further comprising the step of: controlling file transfer between a first terminal and a mail box assigned to a second terminal.

* * * * *